United States Patent Office 2,996,391
Patented Aug. 15, 1961

2,996,391
OPTICAL GLASS
Gustav Weissenberg, Marburg (Lahn), and Norbert Meinert, Kreis Marburg, Germany, assignors to Ernst Leitz, G.m.b.H., Wetzlar (Lahn), Germany, a corporation of Germany
No Drawing. Original application Jan. 21, 1953, Ser. No. 332,558, now Patent No. 2,777,774, dated Jan. 15, 1957. Divided and this application June 30, 1954, Ser. No. 440,538
11 Claims. (Cl. 106—47)

This application is a division of our application Ser. No. 332,558, filed January 21, 1953, now Patent Number 2,777,774 of January 15, 1957.

Our present invention relates to optical glass and more particularly to a glass of unusually low dispersion. These glasses are colorless and substantially not attacked by the atmosphere. Moreover they can be pressed at the temperatures customary for this purpose. A further advantage of these glasses is that they may easily be made free from striae.

It has long been known that phosphates of the alkaline earth metals alone, either singly or as a group, are indeed glass forming and easily yield crown glasses. These crown glasses are tied to various disadvantages. First, the index of refraction of the single metaphosphates is generally, relatively very low. Second, the metaphosphates are very viscous so that it is very difficult to form glass free from striae. It was therefore indeed proposed to melt metaphosphates with a slight excess of oxides of the same elements or with metasilicates or metaborates of the respective elements. Melting of the individual metaphosphates to crown glasses has been avoided for many years.

The new crown glasses of our invention are obtained by the common melting of a mixture of at least one metaphosphate of the elements of the group consisting of magnesium, calcium, strontium, barium with at least one oxide of an element of the group consisting of boron, magnesium, calcium, strontium and barium. In a further development carbonates may also be combined with the metaphosphates.

In a further development of the invention one or several metaphosphates are combined with oxides and carbonates. Further the metaphosphates may be combined with one or several orthophosphates of the same group while at the same time oxides or carbonates may be incorporated as additives. The oxides or the orthophosphates of lanthanum or indium may be added to raise the index of refraction of the mixed melt. The metaphosphate may be between 20% and 48.8% by weight of the melt, and the percent of orthophosphate between 25% and 80% by weight of the melt.

Further features of the invention relate to the addition of oxides of the group consisting of boron, lanthanum, barium, calcium and strontium and the addition of orthophosphates of at least one element of the group consisting of boron, indium and lanthanum. The addition of oxides of the boron, indium and lanthanum group may for certain purposes be made together with lithium carbonate.

Various examples of crown glass of our invention are illustrated in the following tables:

TABLE 1

This table exemplifies glasses formed by melting a typical metaphosphate selected from the group of magnesium, calcium, strontium and barium of the alkaline earth metals within the limits of 20 to 55 percent by weight and an orthophosphate of the same group within the limits of 45 to 80 percent by weight.

[in percent by weight]

| Melt No. | $Mg(PO_3)_2$ | $Ba_3(PO_4)_2$ | $n_D$ | $\nu$ |
|---|---|---|---|---|
| R 52 | 40 | 60 | 1.5850 | 66.0 |
| R 53 | 33.4 | 66.6 | 1.5930 | 66.7 |
| R 54 | 28.6 | 71.4 | 1.6005 | 64.7 |
| R 55 | 25 | 75 | 1.6053 | 64.4 |
| W 298/R 56 | 20 | 80 | 1.6118 | 64.2 |

TABLE 2

This table shows glasses of the compositions of Table 1 in which the orthophosphates have been partly substituted by boron trioxide.

[in percent by weight]

| Melt No. | $Mg(PO_3)_2$ | $Ba_3(PO_4)_2$ | $B_2O_3$ | $n_D$ | $\nu$ |
|---|---|---|---|---|---|
| R 144 | 45.5 | 45.5 | 9 | 1.5751 | 67.0 |
| R 151 | 41.7 | 41.7 | 16.6 | 1.5770 | 69.1 |
| W 325/R 158 | 38.4 | 38.4 | 23.2 | 1.5690 | 68.0 |

TABLE 3

In this table the orthophosphates have been substituted in part by boron trioxide and barium oxide.

[in percent by weight]

| Melt No. | $Mg(PO_3)_2$ | $Ba_3(PO_4)_2$ | $B_2O_3$ | $BaO$ | $n_D$ | $\nu$ |
|---|---|---|---|---|---|---|
| W 317/R 152 | 38.5 | 38.5 | 15.3 | 7.7 | 1.5811 | 68.3 |
| R 153 | 35.7 | 35.7 | 14.3 | 14.3 | 1.5928 | 66.0 |
| R 154 | 33.3 | 33.3 | 13.3 | 20.1 | 1.6010 | 65.8 |

TABLE 4

[in percent by weight]

| Melt No. | $Mg(PO_3)_2$ | $Ba_3(PO_4)_2$ | $La_2O_3$ | $n_D$ | $\nu$ |
|---|---|---|---|---|---|
| R 85 | 32.9 | 65.8 | 1.3 | 1.5974 | 65.2 |
| R 86 | 32.2 | 64.5 | 3.3 | 1.6046 | 65.0 |
| R 87 | 31.3 | 62.5 | 6.2 | 1.6103 | 63.2 |

TABLE 5

In this table, lithium carbonate has been added to glass mixes of the type shown in Table 3.

[in percent by weight]

| Melt No. | $Mg(PO_3)_2$ | $Sr_3(PO_4)_2$ | $B_2O_3$ | $BaO$ | $Li_2CO_3$ | $n_D$ | $\nu$ |
|---|---|---|---|---|---|---|---|
| R 115 | 28.6 | 28.6 | 14.2 | 28.6 | | 1.6033 | 66.8 |
| R 116 | 26.0 | 26.0 | 13.0 | 35.0 | | 1.6116 | 62.8 |
| R 169 | 43.5 | 43.5 | 8.7 | | 4.3 | 1.5789 | 67.9 |
| R 170 | 41.6 | 41.6 | 8.4 | | 8.4 | 1.5792 | 67.4 |
| R 112 | 35.3 | 35.3 | 17.6 | | 11.8 | 1.5785 | 69.7 |
| R 171 | 40.0 | 40.0 | 8.0 | | 12.0 | 1.5815 | 67.4 |
| R 117 | 31.6 | 31.6 | 15.7 | | 21.1 | 1.5819 | 67.3 |
| R 110 | 33.3 | 33.3 | 16.7 | 11.1 | 5.6 | 1.5877 | 68.7 |
| R 111 | 33.3 | 33.3 | 16.7 | 5.6 | 11.1 | 1.5843 | 66.7 |
| R 130 | 25.0 | 25.0 | 16.6 | 22.2 | 11.2 | 1.6020 | 66.3 |

TABLE 6

In this table a mixture of orthophosphates of the group defined in claim 1 is shown to which has been added lanthanum oxide in amount up to about 5 percent.

[in percent by weight]

| Melt No. | $Mg(PO_3)_2$ | $Sr_3(PO_4)_2$ | $Ba_3(PO_4)_2$ | $La_2O_3$ | $n_D$ | $\nu$ |
|---|---|---|---|---|---|---|
| R 89 | 40.0 | 40.0 | 20.0 | | 1.5846 | 68.3 |
| R 90 | 33.4 | 33.3 | 33.3 | | 1.5934 | 67.3 |
| R 91 | 39.6 | 39.6 | 19.8 | 1.0 | 1.5874 | 65.6 |
| R 92 | 39.0 | 39.0 | 19.5 | 2.5 | 1.5902 | 64.5 |
| R 94 | 33.0 | 33.0 | 33.0 | 1.0 | 1.5973 | 63.7 |
| R 95 | 32.5 | 32.5 | 32.5 | 2.5 | 1.6007 | 65.2 |
| R 96 | 31.7 | 31.7 | 31.7 | 4.9 | 1.6047 | 64.8 |

TABLE 7

In the mixes of this table the addition of lithium carbonate is illustrated. In one example this permits the addition of 11 percent by weight of lanthanum oxide.

[in percent by weight]

| Melt No. | Mg(PO₃)₂ | Sr₃(PO₄)₂ | La₂O₃ | Li₂CO₃ | $n_D$ | $\nu$ |
|---|---|---|---|---|---|---|
| R 82 | 48.8 | 48.8 | 1.2 | 1.2 | 1.5718 | 70.3 |
| R 83 | 46.5 | 46.5 | 5.8 | 1.2 | 1.5838 | 68.6 |
| R 84 | 44.0 | 44.0 | 11.0 | 1.0 | 1.5946 | 67.8 |

TABLE 8

This table illustrates the use of a mixture of orthophosphates of the group specified in Table 1 and also their substitution in part by boron orthophosphate up to 20 percent by weight.

[in percent by weight]

| Melt No. | Mg(PO₃)₂ | Ba₃(PO₄)₂ | BPO₄ | Sr₃(PO₄)₂ | $n_D$ | $\nu$ |
|---|---|---|---|---|---|---|
| R 179 | 41.6 | 41.6 | 16.8 | | 1.5711 | 67.5 |
| R 178 | 45.4 | 45.4 | 9.2 | | 1.5710 | 67.0 |
| R 177 | 40.0 | | 20.0 | 40.0 | 1.5697 | 68.0 |
| R 176 | 44.5 | | 11.0 | 44.5 | 1.5708 | 68.0 |

TABLE 9

This table shows the substitution of either lanthanum orthophosphate and of indium orthophosphate between the limits of 5.3% and 11.7% by weight.

[in percent by weight]

| Melt No. | Mg(PO₃)₂ | Ba₃(PO₄)₂ | LaPO₄ | InPO₄ | $n_D$ | $\nu$ |
|---|---|---|---|---|---|---|
| R 60 | 27.2 | 67.5 | 5.3 | | 1.6101 | 62.7 |
| R 61 | 31.2 | 62.5 | 6.3 | | 1.6022 | 64.2 |
| R 62 | 29.4 | 58.9 | 11.7 | | 1.6050 | 63.6 |
| R 65 | 31.4 | 63.0 | | 5.6 | 1.5965 | 66.2 |
| R 66 | 29.8 | 59.5 | | 10.7 | 1.5982 | 63.4 |

Having described our invention, what we claim is:

1. Optical crown glass consisting essentially of a vitrified mixture of at least one metaphosphate of an element of the group consisting of magnesium, calcium, strontium and barium from 20 to 55 percent by weight and of at least one orthophosphate of an element of the group consisting of magnesium, calcium, strontium and barium from 45 to 80 percent by weight.

2. Optical crown glass of claim 1 in which the orthophosphates of the group consisting of magnesium, calcium, strontium and barium are substituted in part by at least one oxide of the group consisting of magnesium, calcium, strontium and barium, the orthophosphates being at least 20% by weight.

3. Optical crown glass of claim 1 in which the orthophosphates of the group consisting of magnesium, calcium, strontium and barium are substituted in part by at least one orthophosphate of an element of the group consisting of boron, indium and lanthanum, the orthophosphates of the group consisting of magnesium, calcium, strontium, barium being at least 20% by weight.

4. Optical crown glass of claim 1 in which the orthophosphates of the group consisting of magnesium, calcium, strontium and barium are substituted in part by at least one oxide of an element of the group consisting of boron, indium and lanthanum, the orthophosphates of the group consisting of magnesium, calcium, strontium, and barium being at least 20% by weight.

5. Optical crown glass consisting of 31.7 to 40% by weight of magnesium metaphosphate; 31.7 to 40% by weight of strontium orthophosphate and 19.5 to 33.3% by weight of barium orthophosphate.

6. Optical crown glass consisting essentially of 31.7 to 40% by weight of magnesium metaphosphate; 31.7 to 40% by weight of strontium orthophosphate; 19.5 to 33% by weight of barium orthophosphate and 1 to 40% by weight of lanthanum oxide.

7. Optical crown glass consisting essentially of 44 to 48.8% by weight of magnesium metaphosphate; 44 to 48.8% by weight of strontium orthophosphate; 1.2 to 11% by weight of lanthanum oxide and 1.0 to 1.2% by weight of lithium carbonate.

8. Optical crown glass consisting essentially of 27.2 to 45.4% by weight of at least one metaphosphate of an element of the group consisting of magnesium, calcium, strontium and barium; 5.3 to 20% by weight of at least one orthophosphate of an element of the group consisting of boron, lanthanum and indium and 40 to 67.5% by weight of at least one orthophosphate of an element of the group consisting of magnesium, calcium, strontium, boron and barium and in which the combined orthophosphates equal 54.6 to 72.8% by weight of the glass.

9. Optical crown glass consisting essentially of 38.4 to 45.5% by weight of magnesium metaphosphate; 38.4 to 45.5% by weight of barium orthophosphate and 9 to 23.2% by weight of boron orthophosphate.

10. Optical crown glass consisting essentially of 27.2 to 32.9% by weight of magnesium metaphosphate; 58.9 to 67.5% by weight of barium orthophosphate and 1.3 to 11.7% by weight of lanthanum orthophosphate.

11. Optical crown glass consisting of 29.8 to 31.4% by weight of magnesium metaphosphate; 59.5 to 63% by weight of barium orthophosphate and 5.6 to 10.7% by weight of indium orthophosphate.

References Cited in the file of this patent

UNITED STATES PATENTS

| 2,278,501 | Tillyer et al. | Apr. 7, 1942 |
| 2,294,844 | Gelstharp | Sept. 1, 1942 |

OTHER REFERENCES

The Glass Industry, February 1935, page 51, article by Blau and Silverman.